(12) United States Patent
Shimizu et al.

(10) Patent No.: US 9,377,304 B2
(45) Date of Patent: Jun. 28, 2016

(54) DESTINATION RECOMMENDATION SYSTEM, DESTINATION RECOMMENDATION METHOD AND DESTINATION RECOMMENDATION PROGRAM PRODUCT

(71) Applicant: DENSO CORPORATION, Kariya, Aichi-pref. (JP)

(72) Inventors: Yasuhiro Shimizu, Tokoname (JP); Nobuhiro Mizuno, Ichihara (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/941,794

(22) Filed: Jul. 15, 2013

(65) Prior Publication Data
US 2014/0025296 A1 Jan. 23, 2014

(30) Foreign Application Priority Data
Jul. 17, 2012 (JP) .................................. 2012-158794

(51) Int. Cl.
*G01C 21/00* (2006.01)
*G01C 21/36* (2006.01)

(52) U.S. Cl.
CPC ............ *G01C 21/00* (2013.01); *G01C 21/3617* (2013.01); *G01C 21/3679* (2013.01)

(58) Field of Classification Search
CPC .... G01C 21/32; G01C 21/34; G01C 21/3461; G01C 21/3492
See application file for complete search history.

(56) References Cited

U.S. PATENT DOCUMENTS

| | | | |
|---|---|---|---|
| 7,209,827 B2 * | 4/2007 | Tajima et al. | 701/465 |
| 8,438,127 B2 | 5/2013 | Kurata et al. | |
| 2004/0260457 A1 * | 12/2004 | Kawase et al. | 701/200 |
| 2004/0260466 A1 * | 12/2004 | Ichihara et al. | 701/209 |
| 2006/0271531 A1 * | 11/2006 | O'Clair et al. | 707/5 |
| 2007/0208498 A1 * | 9/2007 | Barker et al. | 701/117 |
| 2008/0177463 A1 * | 7/2008 | Hamaguchi | 701/201 |
| 2009/0105934 A1 * | 4/2009 | Tajima et al. | 701/118 |
| 2011/0081634 A1 * | 4/2011 | Kurata et al. | 434/236 |
| 2011/0238289 A1 * | 9/2011 | Lehmann et al. | 701/201 |

FOREIGN PATENT DOCUMENTS

| | | |
|---|---|---|
| JP | 2009-115594 A | 5/2009 |
| JP | 2010-190683 A | 9/2010 |
| JP | 2011-048582 A | 3/2011 |
| JP | 2011-060059 A | 3/2011 |
| JP | 2011-198292 A | 10/2011 |

* cited by examiner

*Primary Examiner* — John R Olszewski
*Assistant Examiner* — Nicholas K Wiltey
(74) *Attorney, Agent, or Firm* — Posz Law Group, PLC (57) ABSTRACT

A destination recommendation system includes a map database storing facility data, a travel history database storing travel history data, a trip destination determination section, a calculation section, a search section, and an output portion. The trip destination determination section determines plural trip destinations corresponding to a hub position when the number or a frequency of a plurality of visits from the hub position to each of the trip destinations satisfies a predetermined condition. The calculation section calculates a distance or necessary travel time from the hub position to each trip destination, and calculates a mode value of the distance or the necessary travel time. The search section searches for a target facility that is located within a range of the mode value of the distance or the necessary travel time. The output portion outputs the target facility to a user.

14 Claims, 9 Drawing Sheets

| DT | DP | AT | AP |
|---|---|---|---|
| 5/25 8:00 | HOME | 5/25 8:30 | COMPANY |
| 5/25 19:00 | COMPANY | 5/25 19:40 | HOME |
| 5/26 9:30 | HOME | 5/26 10:50 | AMUSEMENT PARK |
| 5/26 18:00 | AMUSEMENT PARK | 5/26 19:00 | HOME |
| 5/27 11:00 | HOME | 5/27 11:20 | SUPERMARKET |
| 5/27 11:45 | SUPERMARKET | 5/27 11:50 | GAS STATION A |
| 5/27 11:55 | GAS STATION A | 5/27 12:15 | HOME |
| 5/28 9:00 | HOME | 5/28 9:20 | HOSPITAL B |
| 5/28 10:30 | HOSPITAL B | 5/28 10:50 | HOME |
| ⋮ | ⋮ | ⋮ | ⋮ |

DESTINATION RECOMMENDATION SYSTEM, DESTINATION RECOMMENDATION METHOD AND DESTINATION RECOMMENDATION PROGRAM PRODUCT

CROSS REFERENCE TO RELATED APPLICATION

This application is based on Japanese Patent Application No. 2012-158794 filed on Jul. 17, 2012, the disclosure of which is incorporated herein by reference.

TECHNICAL FIELD

The present disclosure relates to a destination recommendation system, a destination recommendation method and a destination recommendation program product.

BACKGROUND

Conventionally, an application program that recommends a candidate of a destination is well known as disclosed in JP 2009-115594 A. In an application program disclosed in JP 2009-115594 A, a speech recognition section recognizes a category of a destination by separating a speech made by a person located in a vehicle in units of single word. When a final determination condition related to a candidate of a destination category is satisfied, a candidate destination corresponding to the category is indicated.

As described above, a conventional application program is capable of recommending a destination corresponding to a category that is desired by a user. However, with the conventional application program, a destination located out of an area of movement of the user may be recommended to the user, and it is difficult for the user to access the recommended destination.

SUMMARY

In view of the foregoing difficulties, it is an object of the present disclosure to provide a destination recommendation system that recommends a destination located within an area that is easy to be accessed by a user. It is another object of the present disclosure to provide a destination recommendation method that recommends a destination located within an area that is easy to be accessed by a user. Further, it is another object of the present disclosure to provide a destination recommendation program product that recommends a destination located within an area that is easy to be accessed by a user.

According to a first aspect of the present disclosure, a destination recommendation system includes a map database, a travel history database, a trip destination determination section, a calculation section, a search section, and an output portion. The map database stores a plurality of facility data related to a plurality of facilities including a target facility. The travel history database stores travel history data of a vehicle. The trip destination determination section determines, based on the travel history data, a plurality of trip destinations corresponding to a hub position when the number or a frequency of a plurality of visits from the hub position to each of the trip destinations satisfies a predetermined condition. The hub position is a point having the number of departures equal to or larger than a predetermined number of departures. The calculation section calculates a distance or necessary travel time from the hub position to each of the trip destinations, and calculates a mode value of the distance or the necessary travel time. The search section searches the plurality of facility data stored in the map database for the target facility that is located within a range of the mode value of the distance or the necessary travel time. The output portion outputs the target facility searched by the search section to a user.

With the above system, a destination located within an area that is easy to be accessed by a user is recommended to the user.

According to a second aspect of the present disclosure, a method of recommending a trip destination to a user, which is executed by a destination recommendation system based on travel history data of a vehicle stored in a travel history database, includes setting a position having the number of departures equal to or larger than a predetermined number of departures as a hub position based on the travel history data, determining a plurality of trip destinations when the number or a frequency of a plurality of visits from the hub position to each of the trip destinations satisfies a predetermined condition; calculating a distance or necessary travel time from the hub position to each of the trip destinations, calculating a mode value of the distance or the necessary travel time, searching a plurality of facility data stored in a map database for a target facility that is located within a range of the mode value of the distance or the necessary travel time, and outputting the target facility to a user.

With the above method, a destination located within an area that is easy to be accessed by a user is recommended to the user.

According to a third aspect of the present disclosure, a destination recommendation program product, which is stored in a non-transitory computer-readable medium for recommending a trip destination to a user based on travel history data stored in a travel history database and is executed by a computer, includes instructions for setting a position having the number of departures equal to or larger than a predetermined number of departures as a hub position based on the travel history data, determining a plurality of trip destinations when the number or a frequency of a plurality of visits from the hub position to each of the trip destinations satisfies a predetermined condition, calculating a distance or necessary travel time from the hub position to each of the trip destinations, calculating a mode value of the distance or the necessary travel time, searching a plurality of facility data stored in a map database for a target facility that is located within a range of the mode value of the distance or the necessary travel time, and outputting the target facility to a user.

With the above program product, a destination located within an area that is easy to be accessed by a user is recommended to the user.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe a destination recommendation system according to an embodiment of the present disclosure with reference to the drawings.

First Embodiment

Figure 1:
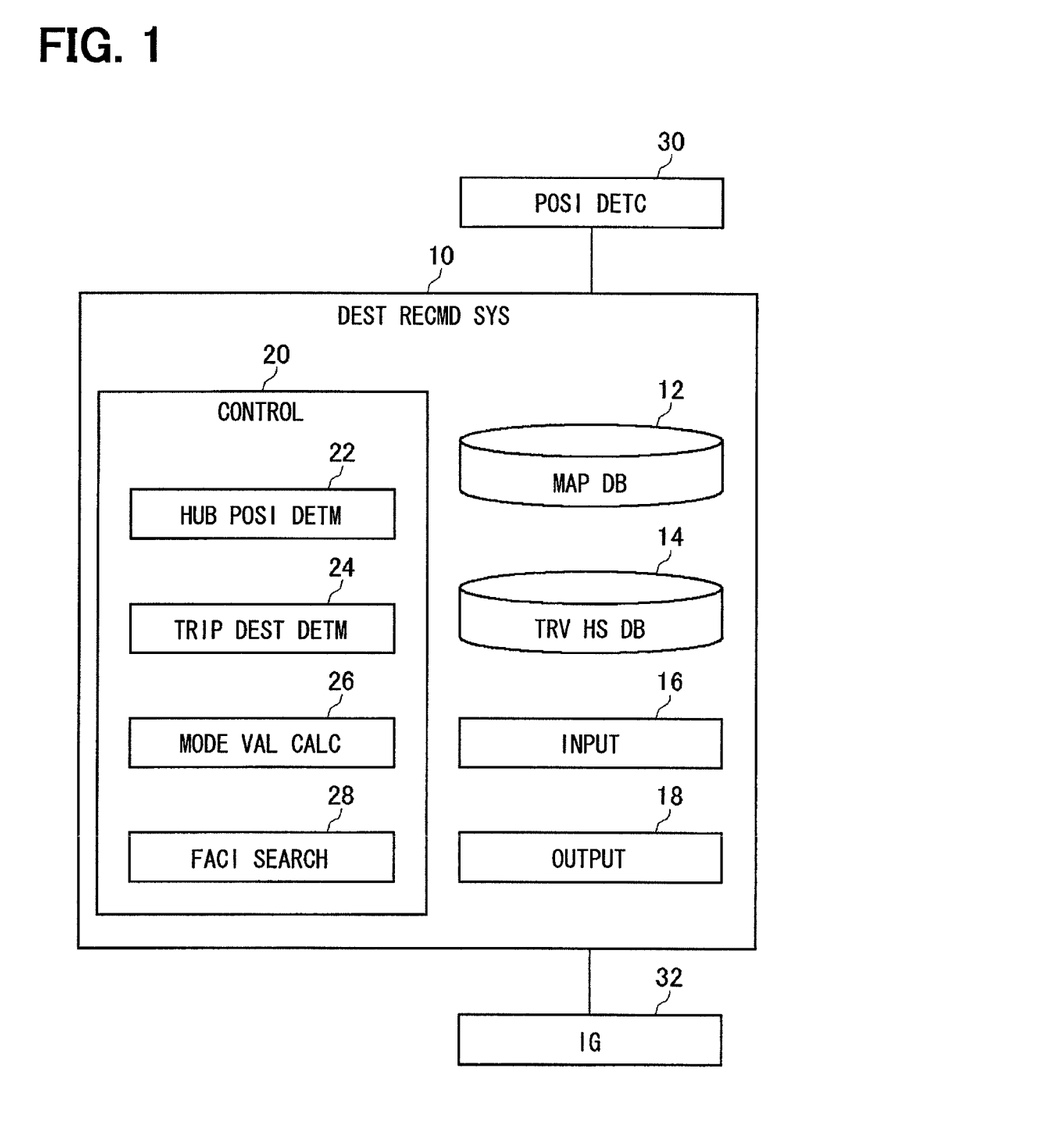
FIG. 1 is a block diagram showing a configuration of a destination recommendation system according to a first embodiment of the present disclosure.

FIG. 1 is a block diagram showing a configuration of a destination recommendation system 10 according to a first embodiment of the present disclosure. The destination recommendation system (DEST RECMD SYS) 10 according to the present embodiment is equipped to a vehicle. The destination recommendation system 10 includes a map database (MAP DB) 12, a travel history database (TRV HS DB) 14, an input portion (INPUT) 16, an output portion (OUTPUT) 18, and a control unit (CONTROL) 20. The map database 12 stores map data, the travel history database stores travel history data of the vehicle, the input portion 16 receives a destination recommendation request input by a user, the control unit 20 searches a plurality of trip destinations for a target trip destination that needs to be recommended to the user, and the output portion 18 outputs the target trip destination to the user.

The destination recommendation system 10 is coupled to a current position detector (POSI DETC) 30 and an ignition key (IG) 32. The current position detector 30 may include a geomagnetic sensor that detects an absolute azimuth of the vehicle, a gyroscope that detects a relative azimuth of the vehicle, a distance sensor that detects a travel distance traveled by the vehicle, a global positioning system (GPS) receiver that detects a position of the vehicle based on a radio wave transmitted from a satellite. Each of the sensors and detectors has an error different from each other due to a property of each sensor or each detector. Thus, the sensors and the detectors may be used in a complementary way. Further, a part of the sensors and detectors may configure the current position detector 30 based on an accuracy requirement. Further, the current position detector 30 may further include a steering rotation sensor (not shown), a speed sensor (not shown) equipped to each trailer wheel or the like. Herein, the trailer wheel is a wheel of the vehicle that is neither a drive wheel nor a steering wheel.

The map database 12 includes road map data, multiple facility data related to multiple facilities. Each of the facility data includes a name, a property, and detailed information of the facility. The property of a facility may be set as tourist facility, restaurant, or department store. The map database 12 may be configured to download latest map data from a server provided in the network.

Figure 2:
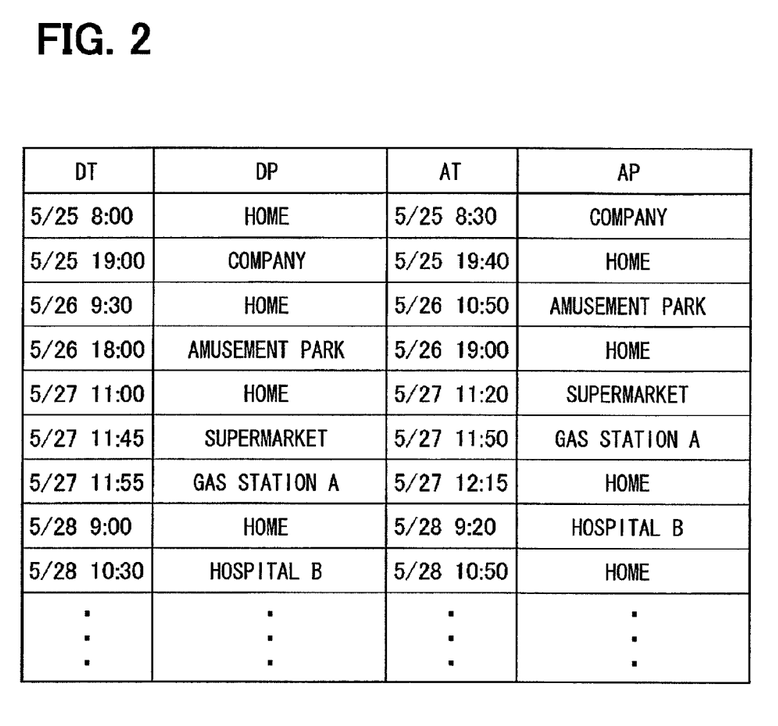
FIG. 2 is a diagram showing an example of travel history data stored in a travel history database.

FIG. 2 is a diagram showing an example of travel history data stored in the travel history database 14. The travel history database 14 stores the travel history data related to a departure time (DT), a departure point (DP), an arrival time (AT) and an arrival point (AP). Hereinafter, the travel history data related to the departure time is referred to as departure time data, the travel history data related to the departure point is referred to as departure point data, the travel history data related to the arrival time is referred to as arrival time data, and the travel history data related to the arrival time is referred to as arrival time data. The destination recommendation system 10 updates the travel history data stored in the travel history database 14 based on a current position of the vehicle detected by the current position detector 30.

The departure time data is time data acquired when an engine of the vehicle is started, and the departure point data is position data acquired when the engine of the vehicle is started. The arrival time data is time data acquired when the engine of the vehicle is stopped, and the arrival point data is position data acquired when the engine of the vehicle is stopped. More specifically, the departure time data is time data acquired when turn on data, which indicates that an ignition key 32 of the vehicle is turned on, is received, and the departure point data is the current position data acquired by the current position detector 30 when the turn on data is received. Further, the arrival time data is time data acquired when turn off data, which indicates that the ignition key 32 of the vehicle is turned off, is received, and the arrival point data is the current position data acquired by the current position detector 30 when the turn off data is received.

A name of the departure point is specified by specifying a facility corresponding to the departure point data read out from the map database 12. A name of the arrival point is specified by specifying a facility corresponding to the arrival point data read out from the map database 12. Further, FIG. 2 shows an example of the travel history data. The travel history data may be stored in a different manner other than the example shown in FIG. 2. In FIG. 2, the departure point data and the arrival point data are separately stored. For example, the departure point data and the arrival point data detected by the current position detector 30 may be stored in a mixed manner in order of time.

The input portion 16 may be provided by, for example, a key pad. The input portion 16 receives the destination recommendation request from the user. The output portion 18 may be provided by, for example, a display screen. The output portion 18 outputs the target trip destination in response to the destination recommendation request input to the input portion 16. The output portion 18 may be provided by a touch panel, and a part of the output portion 18 may function as the input portion 16.

As shown in FIG. 1, the control unit 20 includes a hub position determination section (HUB POSI DETM) 22, a trip destination determination section (TRIP DEST DETM) 24, a mode value calculation section (MODE VAL CALC) 26, and a facility search section (FACI SEARCH) 28 as configurations for searching for the target trip destination that needs to be recommended to the user. The mode value calculation section 26 is also referred to as calculation section 26, and the facility search section 28 is also referred to as search section

28. The hub position is a base point of a movement of the user. In the travel history data, a point that corresponds to multiple destinations is the hub position. That is, when a point having multiple number of departures with respect to multiple arrival points, the point is set as the hub position. A typical example of the hub position is a residence of the user. The residence is also known as a home of the user. Further, a hometown of the user may also be set as the hub position. The hometown usually means a place where the user was born and parents of the user live. The hub position determination section 22 searches the travel history database for a point that has the maximum number of departures as the hub position. The point has the maximum number of departures also corresponds to a large number of destinations. In the present embodiment, the hub position is set based on the number of departures from the point. Alternatively, the number of the destinations corresponding to each departure point may be counted, and the departure point having equal to or larger than a predetermined number of destinations may be set as the hub position. Further, the departure point having the maximum number of destinations may be set as the hub position. Specifically, as shown in FIG. 2, when the residence is the departure point, the destinations corresponding to the residence include a company, an amusement park, a supermarket, and a hospital B. Thus, in this case, the number of the destinations corresponding to the residence as the departure point is four. As described above, the number of the destinations corresponding to each departure point is counted, and then, the hub position is determined based on the number of the destinations. Further, when the residence of the user is preliminarily set as the hub position, the hub position determination section 22 may be omitted.

The trip destination determination section 24 searches multiple arrival points for the trip destinations. The trip destination determination section 24 determines a point visited by the user for a recreational purpose as the trip destination. In the present disclosure, the trip destinations is a point visited by the user for a recreational purpose not for a business or a routine purpose, such as the company or the hospital. The points that need to be visited by the user for something to do or for business purpose, such as the company and the hospital, are not set as the trip destination.

The trip destination determination section 24 compiles data for each arrival point. Then, the trip destination determination section 24 calculates the number of arrivals at each arrival point and an average value of a duration of stay at each arrival point. When the average value of the duration of stay at an arrival point is equal to or smaller than a predetermined threshold duration (for example, 10 minutes), the trip destination determination section 24 determines the arrival point as a stop-off point on a way to another point and does not set the arrival point as the trip destination. When the average value of the duration of stay at an arrival point is larger than the predetermined threshold duration (for example, 10 minutes), the trip destination determination section 24 determines the arrival point as a destination.

Then, the trip destination determination section 24 determines trip destinations when the number or a frequency of visits from the hub position to each destination satisfies a predetermined condition. Specifically, the trip destination determination section 24 searches the destinations for a point that has the number of visits from the hub position smaller than a predetermined threshold number of visits (for example, 5 times) during a predetermined time period, and sets the point as the trip destination. The destination having the number of visits from the hub position equal to or larger than the predetermined threshold number of visits during the predetermined time period is a point that is usually visited by the user. Thus, the trip destination determination section 24 determines that the user has a purpose to visit the point, which has the number of visits from the hub position equal to or larger than the predetermined threshold number of visits during the predetermined time period, and does not set the point as the trip destination.

In the present embodiment, whether the arrival point is to be set as the trip destination is determined based on the number of visits from the hub position to the arrival point. Specifically, the trip destination determination section 24 sets the destination having the number of visits from the hub position smaller than the predetermined threshold number of visits during the predetermined time period as the trip destination as described above. Further, a point that is visited by the user irregularly may be set as the trip destination. Further, when a point has the number of visits from the hub position equal to or larger than the predetermined threshold number of visits and all of the visits are performed during a time period that is longer than the predetermined time period, the point may be set as the trip destination. When a point is visited regularly by the user, even though the point has the number of visits from the hub position smaller than the predetermined threshold number of visits, the trip destination determination section 24 determines that the user visits the point on purpose, such as seeing a doctor, and does not set the point as the trip destination. Further, when the number of visits from the hub position to a point is equal to or larger than the predetermined threshold number of visits (for example 5 times) and the visits are performed during the predetermined time period (for example one month), the trip destination determination section 24 determines that the user visits the point on business or routine purpose, such as seeing a doctor. Thus, the point is not set as the trip destination. That is, when the number of visits from the hub position to a point is equal to or larger than the predetermined threshold number of visits and the visits are performed during the time period longer than the predetermined time period (for example one month), the trip destination determination section 24 determines that the user visits the point on amusement purpose, and sets the point as the trip destination.

The mode value calculation section 26 calculates necessary travel time to move from the hub position to each trip destination. Then, the mode value calculation section 26 calculates a mode value of the necessary travel time to move from the hub position to each trip destination. Herein, the mode value of the necessary travel time indicates the most frequent value of the necessary travel time.

Figure 3:
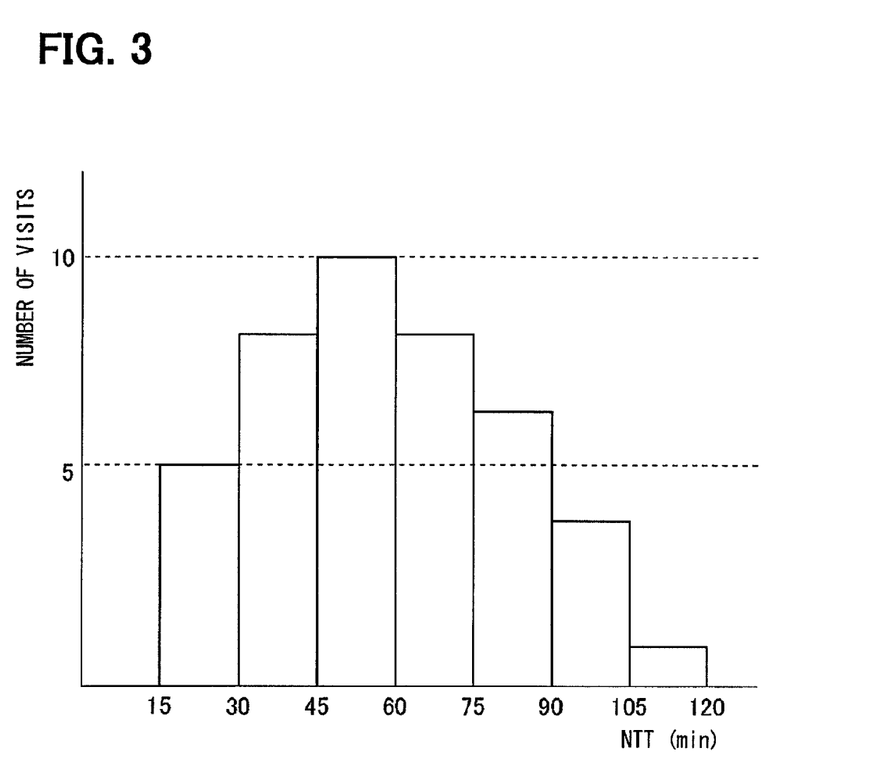
FIG. 3 is a diagram showing an example of calculating a mode value of necessary travel time from a hub position to a trip destination.

FIG. 3 is a histogram showing a relationship between the necessary travel time (NTT) and the number of arrivals (NUM OF ARRIVAL) at the trip destination. As shown in FIG. 3, the trip destinations, each of which has 15 minutes to 30 minutes of necessary travel time, are visited by the user five times. The trip destinations, each of which has 30 minutes to 45 minutes of necessary travel time, are visited by the user eight times. The trip destinations, each of which has 45 minutes to 60 minutes of necessary travel time, are visited by the user ten times. Descriptions for other trip destinations, each of which has more than 60 minutes of necessary travel time, are omitted. Further, as shown in FIG. 3, only the necessary travel time is taken in consideration without considering which trip destination is visited and a property of each trip destination. From a result shown in FIG. 3, the mode value of the necessary travel time to move from the hub position to each trip destination for recreational purpose is within a range of 45 minutes to 60 minutes.

The facility search section 28 searches for facilities located around a point whose necessary travel time from the hub position is equal to the mode value. In the example shown in FIG. 3, the facility search section 28 searches for the facilities located around the point whose necessary travel time from the hub position is within the range of 45 minutes to 60 minutes.

Figure 4:
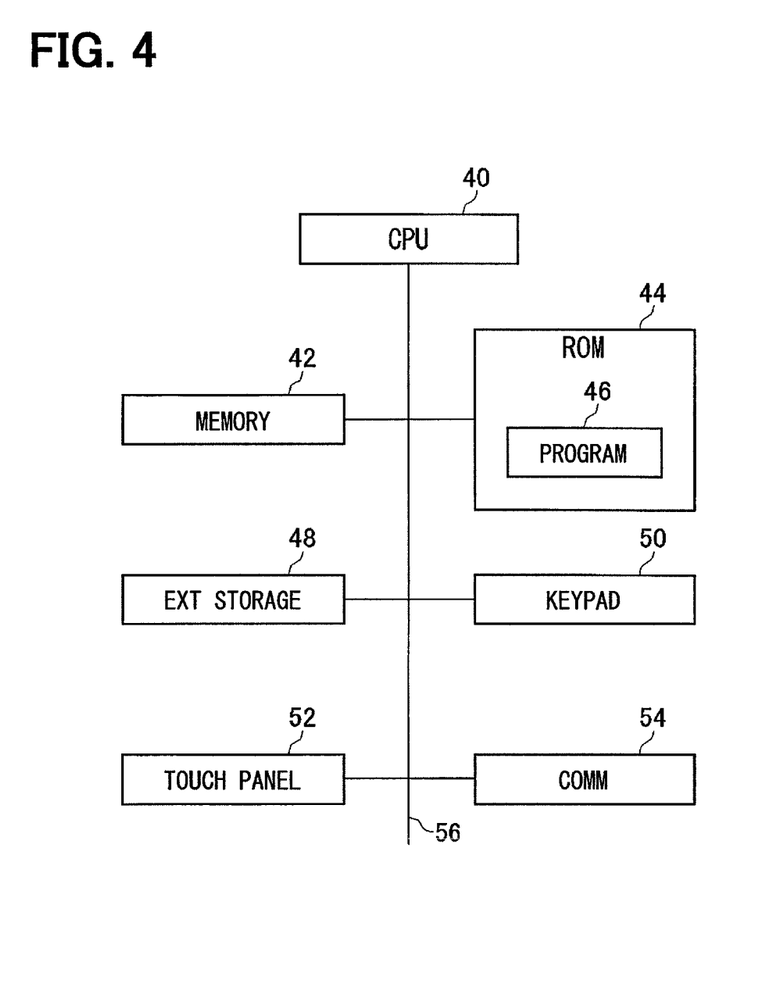
FIG. 4 is a diagram showing a hardware configuration of the destination recommendation system according to the first embodiment.

FIG. 4 shows a hardware configuration of the destination recommendation system 10 according to the present embodiment. The destination recommendation system 10 includes a central processing unit (CPU) 40, a memory 42, a read-only memory (ROM) 44, an external storage device (EXT STORAGE) 48, a keypad 50, a touch panel 52, a communication portion (COMM) 54, and a bus 56. The CPU 40, the memory 42, the ROM 44, the external storage device 48, the keypad 50, the touch panel 52, and the communication portion 54 are coupled with each other by the bus 56. The ROM 44 stores a program 46 for achieving above-described function of the destination recommendation system 10. The program may also be stored in a non-transitory computer-readable medium as a program product. The external storage device 48 stores the map database 12 and the travel history database 14. The communication portion 54 communicates with multiple devices equipped to the vehicle including the current position detector 30, the ignition key 32 and the like.

Figure 5:
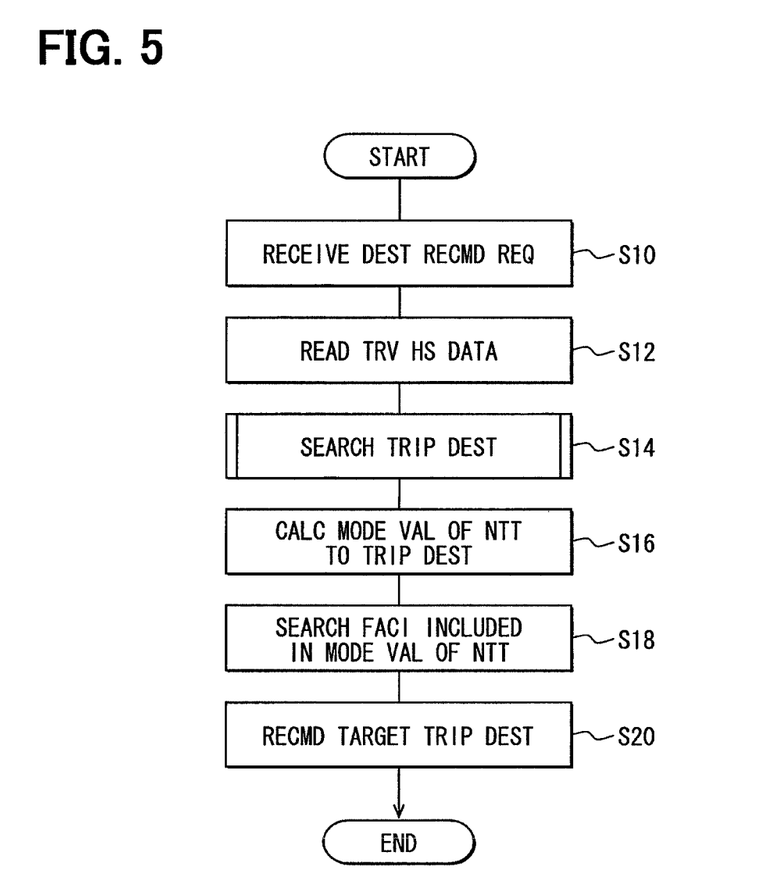
FIG. 5 is a flowchart showing an operation of the destination recommendation system according to the first embodiment.

FIG. 5 is a flowchart showing an operation executed by the destination recommendation system 10 in association with other hardware components of the destination recommendation system 10. When the operation starts, at S10, the destination recommendation system 10 receives the destination recommendation request (DEST RECMD REQ) via the input portion 16. In the present embodiment, the destination recommendation system 10 may display a button for selecting the destination recommendation request on the touch panel 52. When the button is touched by the user, the destination recommendation system 10 may be configured to perform a destination recommendation process.

When the destination recommendation request is received, the destination recommendation system 10 reads the travel history data (TRV HS DATA) from the travel history database 14 at S12. Then, at S14, destination recommendation system 10 searches for the trip destinations (TRIP DEST) based on the travel history data. The search of the trip destinations will be described later in detail with reference to FIG. 6.

At S16, the destination recommendation system 10 calculates the necessary travel time (NTT) to move from the hub position to each trip destination (TRIP DEST). Then, the destination recommendation system 10 calculates the mode value (MODE VAL) of the necessary travel time. At S18, the destination recommendation system 10 searches for a facility (FACI) included in a range of the mode value of the necessary travel time. At S20, the destination recommendation system 10 recommends the facility searched at S18 as the target trip destination to the user. The facility recommended to the user as the target trip destination is also referred to as a target facility.

Figure 6:
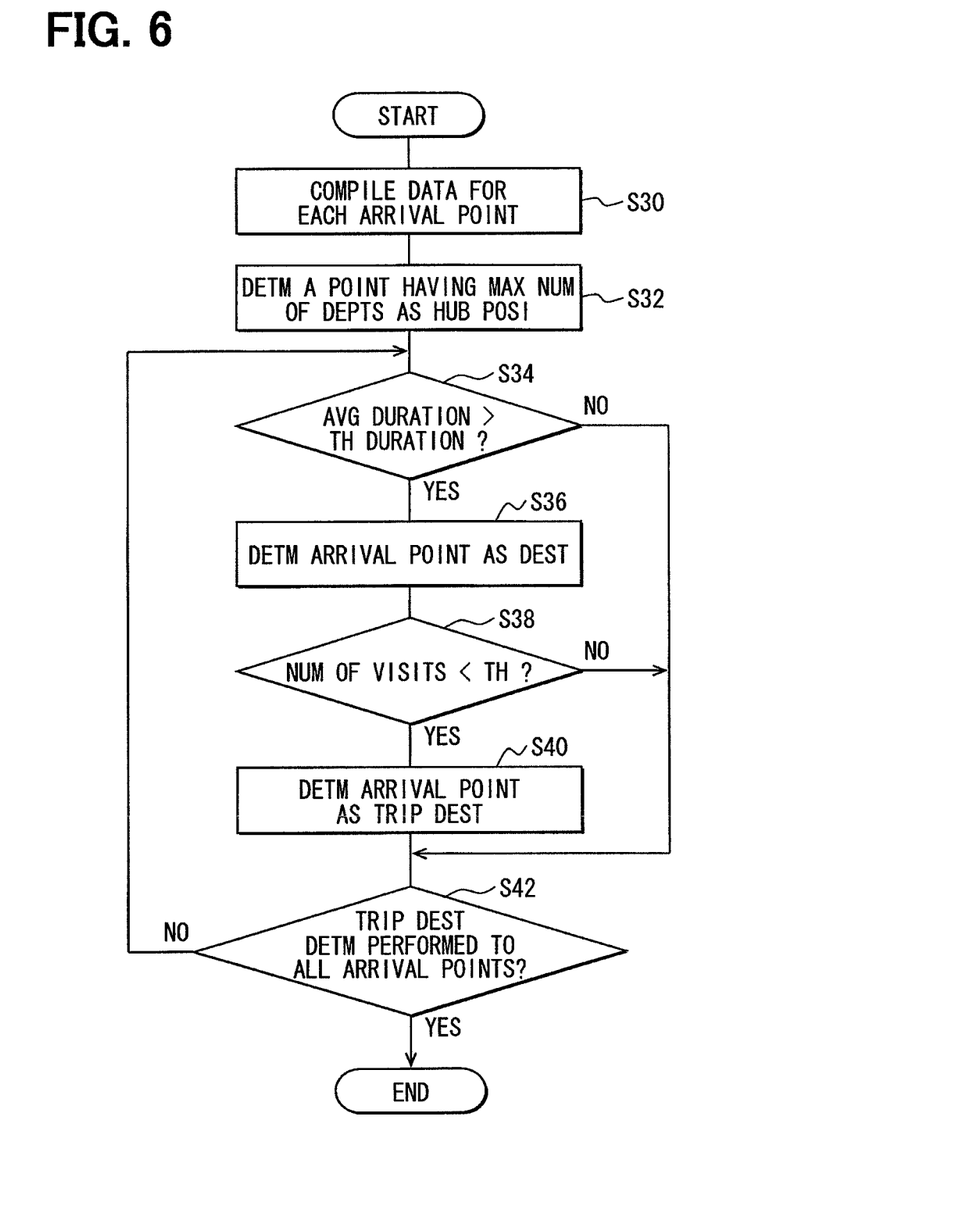
FIG. 6 is a flowchart showing a determination operation of a trip destination.

The following will describe the search of the trip destinations performed by the destination recommendation system 10 with reference to FIG. 6. The number of trip destinations searched by the destination recommendation system 10 may be one or more. At S30, for each arrival point, the destination recommendation system 10 compiles a plurality of data indicating the number of arrivals and each duration of stay. Each duration of stay at the arrival point is calculated based on the arrival time when the user arrives at the arrival point and the departure time when the user departs from the arrival point after the arrival time.

At S32, the destination recommendation system 10 determines that the point having the maximum number of departures (MAX NUM OF DEPTS) as the hub position (HUB POSI). The point having the maximum number of departures is also a point having the maximum number of arrivals. Thus, in the present embodiment, the destination recommendation system 10 sets the point having the maximum number of departures as the point having the maximum number of arrivals. When the residence of the user is set as the hub position, the process executed at S32 may be omitted.

At S34, the destination recommendation system 10 determines whether the average value of the durations of stays (AVG DURATION) at each arrival point is larger than the predetermined threshold duration (TH DURATION). When the average value of the durations of stays at an arrival point is equal to or shorter than the predetermined threshold duration (S34: NO), the destination recommendation system 10 further determines whether a determination of trip destination is performed to all of the arrival points at S42. When the destination recommendation system 10 determines that the determination of trip destination is not performed to all of the arrival points (S42: NO), the destination recommendation system 10 returns to S34.

At S34, when the destination recommendation system 10 determines that the average value of the durations of stays at an arrival point is longer than the predetermined threshold duration (S34: YES), the destination recommendation system 10 determines that the arrival point is the destination other than the stop-off point at S36. At S38, the destination recommendation system 10 determines whether the number of visits from the hub position to the arrival point is smaller than the predetermined threshold number of visits (TH). Specifically, the destination recommendation system 10 determines whether the number of arrivals is smaller than the predetermined threshold number of visits when the corresponding departure point is the hub position. The predetermined number of visits may be set as, for example, five times. When the number of visits from the hub position to the arrival point is smaller than the predetermined threshold number of visits (S38: YES), the destination recommendation system 10 determines that the arrival point is the trip destination at S40, and determines whether the determination of trip destination is performed to all of the arrival points at S42. At S38, when the number of visits from the hub position to the arrival point is equal to or larger than the predetermined threshold number of visits (S38: NO), the destination recommendation system 10 proceeds to S42 without determining whether the arrival point is the trip destination or not.

After the destination recommendation system 10 performs the determination of the trip destination to all of the arrival points read out from the travel history database 14 (S42: YES), the destination recommendation system 10 ends the process for searching for the trip destination.

The destination recommendation system 10 according to the present embodiment recommends the facility included in a range of the mode value of the necessary travel time to the user. Further, the facility is searched from the trip destinations that have been visited by the user. Thus, the target trip destination, which fits own schedule of the user, is recommended by the destination recommendation system 10. That is, a trip destination located out of an area of movement of the user is avoided to be recommended to the user.

In the destination recommendation system 10 according to the present embodiment, the mode value of the necessary travel time from the hub position to the visited trip destination is used to search for the target trip destination that is to be recommended to the user. Alternatively, a mode value of a distance from the hub position to the trip destination may be used to search for the target trip destination instead of the mode value of the necessary travel time. That is, a facility included in a range of a mode value of the distance from the hub position to the visited trip destination may be recommended to the user as the target trip destination. Thus, the trip destination that is easy to be accessed by the user is recommended to the user.

In the present embodiment, a departure point having the maximum number of departures is set as the hub position. Alternatively, a departure point having the number of departures equal to or larger than a predetermined number of departures (for example, 20 times) may be set as the hub position. Under a condition that the departure point having the maximum number of departures is set as the hub position, when the user uses a private vehicle for business purpose at the company, the number of departures from the company has the maximum value. Thus, the destination recommendation system 10 may fail to determine the residence of the user as the hub position. When the departure point having the number of departures equal to or larger than the predetermined number of departures is set as the hub position, both the company and the residence may be set as the hub position. Further, a residence of a friend with whom the user travels together frequently may be set as the hub position. Further, a residence of a relative of the user may be set as the hub position. When the departure point having the number of departures equal to or larger than the predetermined number of departures is set as the hub position, the number of hub positions may be more than one. In this case, the necessary travel time to the trip destinations or the distance to the trip destinations need to be calculated with respect to each hub position.

Second Embodiment

The following will describe a destination recommendation system 10 according to a second embodiment of the present disclosure. The configuration of the destination recommendation system 10 according to the present embodiment is similar to the destination recommendation system 10 according to the first embodiment. The destination recommendation system 10 according to the present embodiment receives a property of the target trip destination from the user via the input portion 16, and recommends a trip destination that has the same property with the received property as the target trip destination to the user. The property of the target trip destination received from the user via the input portion 16 is also referred to as a target property.

As described above, each facility data stored in the map database 12 includes a sub data indicating a property of the facility. The sub data indicating the property of the facility is also referred to as property sub data. The destination recommendation system 10 specifies a property of each arrival point stored in the travel history database 14 by referring the facility data of each arrival point. The destination recommendation system 10 divides the trip destinations into a plurality of groups based on a property of each of the trip destinations. Then, the destination recommendation system 10 calculates the mode value of the necessary travel time to arrive the trip destinations for each group. That is, the mode value of the necessary travel time to arrive the trip destinations having the same property is calculated. Then, the destination recommendation system 10 determines one of the groups as a target group when the property of each of the trip destinations included in the target group is equal to the target property received by the input portion 16, and searches for the target trip destination that is located within the range of the mode value of the necessary travel time of the target group. Further, the destination recommendation system 10 may only calculate the mode value of the necessary travel time to arrive the trip destinations that has the same property with the target property.

Figure 7A:
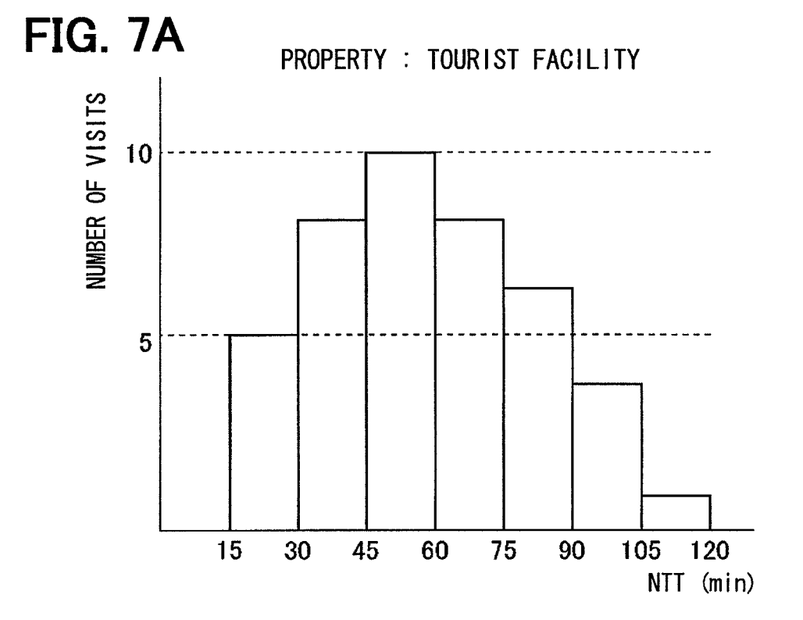
FIG. 7A and FIG. 7B are diagrams showing examples of calculating mode values of necessary travel time from a hub position to a trip destinations in a destination recommendation system according to a second embodiment of the present disclosure.
Figure 7B:
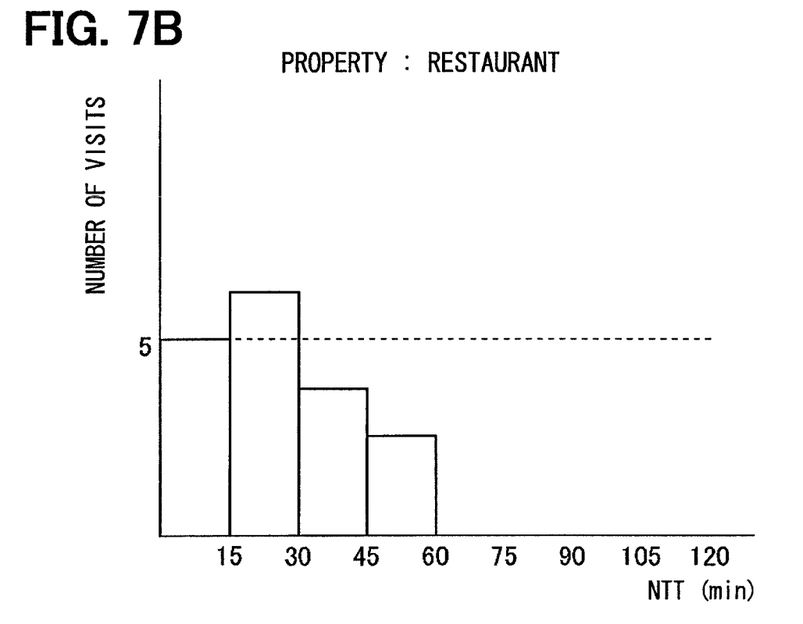

FIG. 7A is an example showing calculation of a mode value of a necessary travel time to trip destinations each of which has a property of tourist facility, and FIG. 7B is an example showing calculation of a mode value of a necessary travel time to trip destinations each of which has a property of restaurant. For example, as shown in the histogram of FIG. 7A, the mode value of the necessary travel time to the trip destinations each of which has the property of tourist facility is within a range of 45 minutes to 60 minutes. Thus, in a case where the user looks for a trip destination having the property of tourist facility, the facility search section 28 searches for a tourist facility within an area that is accessible by the user within 45 minutes to 60 minutes, and recommends the tourist facility to the user as the target trip destination. For example, as shown in the histogram of FIG. 7B, the mode value of the necessary travel time to the trip destinations each of which has the property of restaurant is within a range of 15 minutes to 30 minutes. Thus, in a case where the user looks for a trip destination having the property of restaurant, the facility search section 28 searches for a restaurant within an area that is accessible by the user within 15 minutes to 30 minutes, and recommends the restaurant to the user as the target trip destination.

As described above, a visited trip destination that has the same property with the target property received from the user is recommended to the user. Thus, a trip destination that is in response to a property request of the user is recommended with the destination recommendation system 10 according to the present embodiment. Accordingly, an appropriate destination recommendation is provided by the destination recommendation system 10.

In the destination recommendation system 10 according to the present embodiment, the mode value of the necessary travel time from the hub position to the visited trip destination is used to search for the target trip destination to be recommended. Alternatively, a mode value of a distance from the hub position to the trip destination may be used to search for the target trip destination instead of the mode value of the necessary travel time.

Third Embodiment

The following will describe a destination recommendation system 10 according to a third embodiment of the present disclosure. The configuration of the destination recommendation system 10 according to the present embodiment is similar to the destination recommendation system 10 according to the first embodiment. The destination recommendation system 10 according to the present embodiment receives, from the user, a target travel time from the hub position to the trip destination via the input portion 16, and recommends a trip destination that has the necessary travel time equal to the target travel time to the user as the target trip destination. The target travel time is a necessary travel time desired by the user. In the present embodiment, the number of days of travel is used as an example of the target travel time and the necessary travel time. That is, in the present embodiment, the target travel time and the necessary travel time are counted in units of days. Hereinafter, the number of days of travel is also referred to as the number of travel days.

The destination recommendation system 10 searches the trip destinations based on the travel history data stored in the travel history database 14. Then, the destination recommendation system 10 divides the searched trip destinations into groups based on the number of travel days. The number of travel days is calculated based on the departure time of the hub position and the arrival time of the hub position. For example, when the user departs from the hub position on one day and returns back to the hub position on the next day, the number of travel days is two days and one night. Thus, the trip destination visited by the user is included in the group that has the number of travel days of two days and one night. Then, the destination recommendation system 10 calculates the mode value of the necessary travel time for each of the groups. Then, the destination recommendation system 10 determines one of the groups as a target group when the necessary travel time of the trip destinations included in the one of the groups is equal to the target travel time received by the input portion 16. Then, the destination recommendation system 10 searches for the target trip destination located within the range of the mode value of the necessary travel time of the target group.

Figure 8A:
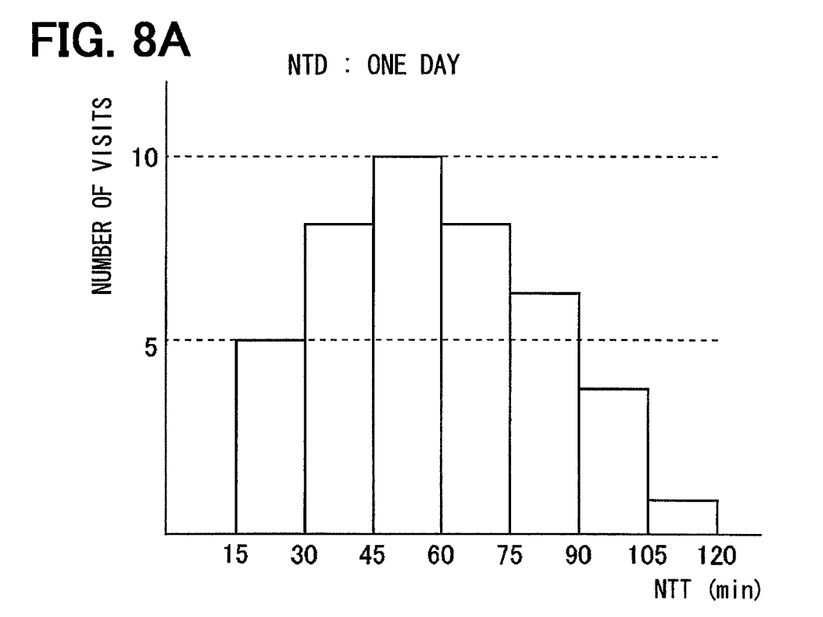
FIG. 8A and FIG. 8B are diagrams showing examples of calculating mode values of necessary travel time from a hub position to a trip destination in a destination recommendation system according to a third embodiment of the present disclosure.
Figure 8B:
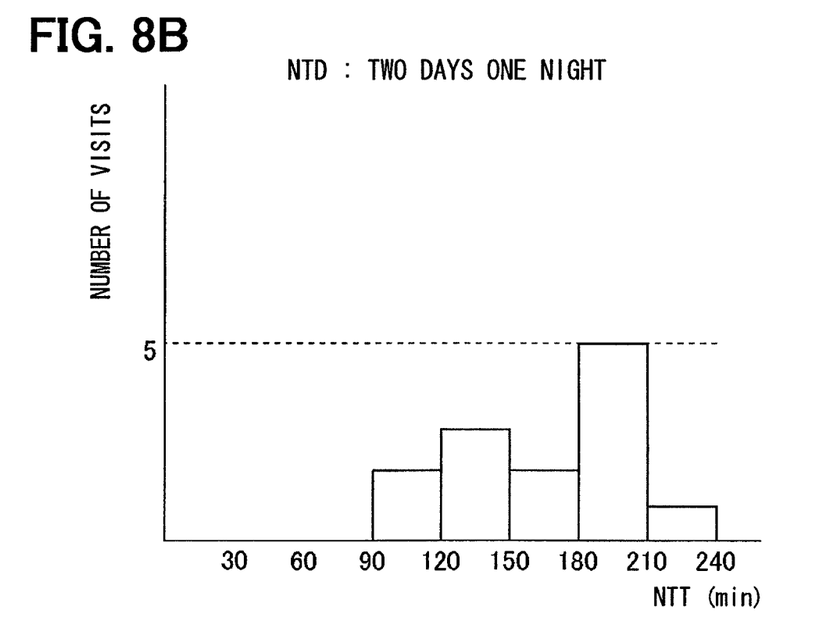

FIG. 8A shows an example of calculating a mode value of the necessary travel time to arrive each trip destination included in a group when the number of travel days (NTD) of each trip destination is one day. FIG. 8B shows an example of calculating a mode value of the necessary travel time to arrive each trip destination included in another group when the number of travel days (NTD) of each trip destination is two days and one night. For example, as shown in the histogram of FIG. 8A, the mode value of the necessary travel time to the trip destinations each of which has the number of travel days of one day is within a range of 45 minutes to 60 minutes. Thus, when the target travel time received from the user is one day, the facility search section 28 searches for a trip destination located within an area that is accessible by the user within a range of 45 minutes to 60 minutes, and recommends the trip destination to the user as the target trip destination. For example, as shown in the histogram of FIG. 8B, the mode value of the necessary travel time to the trip destination having the number of travel days of two days one night is within a range of 180 minutes to 210 minutes. Thus, when the target travel time received from the user is two days one night, the facility search section 28 searches for a trip destination located within an area that is accessible by the user within a range of 180 minutes to 210 minutes, and recommends the trip destination as the target trip destination to the user.

As described above, a visited trip destination that has the number of travel days equal to the target travel time received from the user is recommended to the user. Thus, a trip destination that is in response to a request of the target travel time from the user is recommended with the destination recommendation system 10 according to the present embodiment. Accordingly, an appropriate destination recommendation is provided by the destination recommendation system 10.

In the above-described example, the target travel time is set as the number of travel days, such as one day or two days and one night. That is, the target travel time is set on day base. Further, the number of travel hours, such as 3 hours, 6 hours, 9 hours, may be used as the target travel time. That is, the target travel time may be set on hour base.

In the destination recommendation system 10 according to the present embodiment, the mode value of the necessary travel time from the hub position to the visited trip destination is used to search for the target trip destination to be recommended. Alternatively, a mode value of a distance from the hub position to the trip destination may be used to search for the target trip destination instead of the mode value of the necessary travel time.

Other Embodiments

In the foregoing embodiments, the destination recommendation system 10 is equipped to the vehicle. Further, the destination recommendation system 10 may be achieved by a personal computer of the user without equipping to the vehicle. The personal computer may be a computer used in the residence of the user. In this case, the travel history data acquired by the detectors and the sensors of the vehicle need to be transmitted or moved to the personal computer via a universal serial bus (USB) memory or a storage device.

Further, when the target trip destination is searched for within a range of the mode value of the necessary travel time or the distance, a search range may be extended in a direction visited by the user frequently. For example, when the user searches for a facility that is accessible within 45 minutes to 60 minutes, that is the target travel time is within a range of 45 minutes to 60 minutes, the facility may be searched from the trip destinations, which are located in a direction to the company of the user and are accessible within 45 minutes to 75 minutes. Usually, when a person travels along a familiar road for a time period, the person feels the time period is shorter compared with a case in which the person travels along an unfamiliar road for the same time period. Thus, by setting the necessary travel time longer than the mode value in the direction visited by the user frequently, an appropriate destination recommendation is provided by the destination recommendation system 10.

In the foregoing embodiments, the recommendation process of the trip destination is executed by the destination recommendation system 10, which is deemed as one device. Further, the destination recommendation system 10 may be provided by multiple devices, such as a server and a terminal, coupled via the network.

Figure 9:
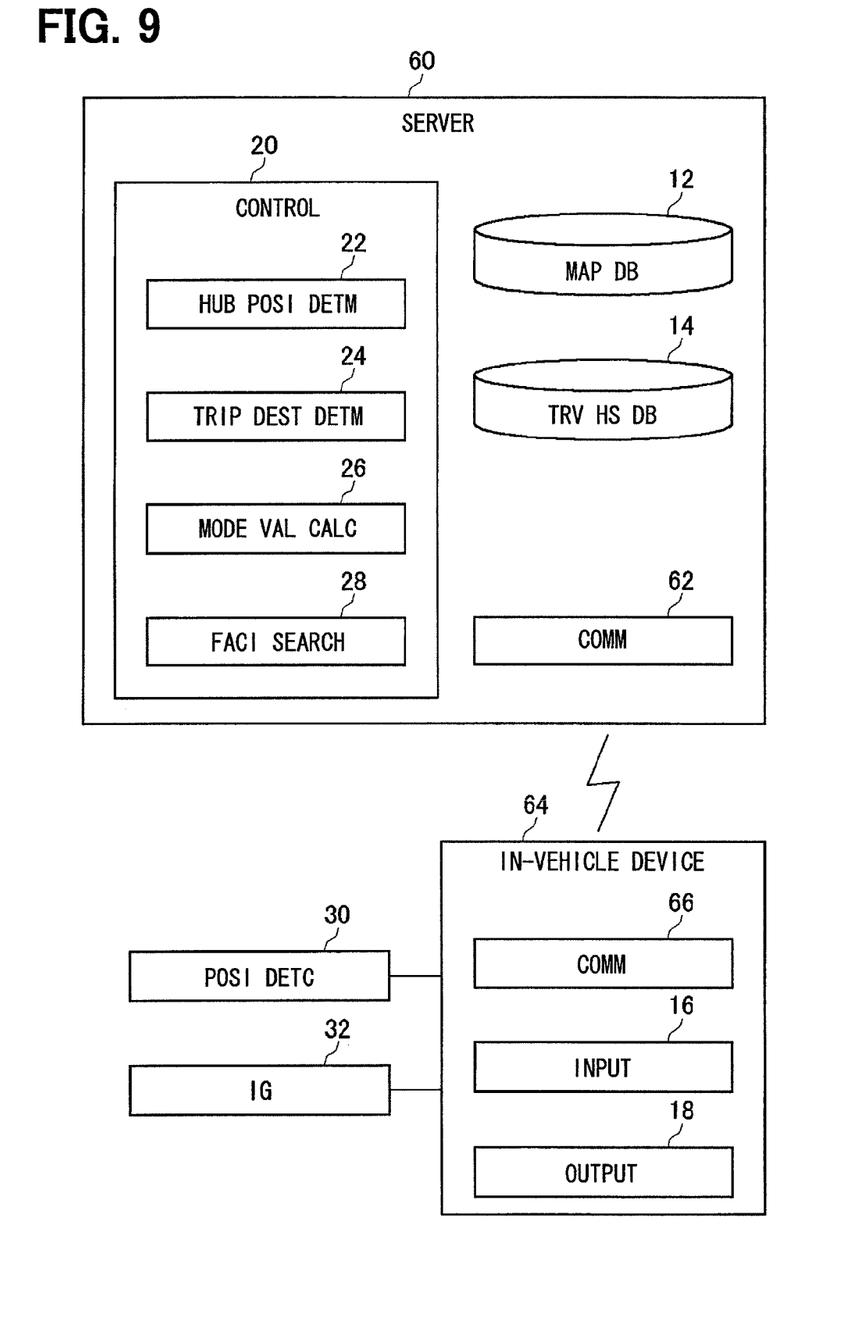
FIG. 9 is a block diagram showing a configuration of a destination recommendation system when components of the destination recommendation system are coupled to each other via a network.

FIG. 9 shows a configuration of the destination recommendation system in which the input portion 16 and the output portion 18 are included in an in-vehicle device 64, and other components are included in a server 60. The in-vehicle device 64 further includes a communication portion (COMM) 62, and the server 60 further includes a communication portion (COMM) 66. The in-vehicle device 64 and the server 60 communicate with each other via the communication portions 62, 66 in the network. With this configuration, when the in-vehicle device 64 acquires the departure point data and the arrival point data, the in-vehicle device 64 transmits the departure point data and the arrival point data to the server 60. The server 60 stores the departure point data and the arrival point data received from the in-vehicle device 64 in the travel history database 14. When the destination recommendation request is received from the user via the input portion 16 of the in-vehicle device 64, the in-vehicle device 64 transmits the destination recommendation request to the server 60. The server 60 searches for the trip destination as described above, and transmits searched facility data of the target facility to the in-vehicle device 64. The in-vehicle device 64 recommends the target facility received from the server 60 to the user via the output portion 18. The destination recommendation system 10 may be configured in a different manner based on a function block on the internet other than the example shown in FIG. 9. For example, calculating a range to be searched may be performed in the in-vehicle device 64, and searching for the target facility within the range may be performed by the server 60.

In the foregoing embodiments, the hub position is selected from the departure points based on the departure point data stored in the travel history database 14. Further, a point other than the departure point may be set as the hub position. For example, suppose that road link data of a traveled road is stored in the travel history database. The destination recommendation system may analyze the road link data in order to detect an intersection, which is a branch point to multiple destinations, and may set the intersection as the hub position. With this configuration, an appropriate trip destination with respect to the inter section is recommended to the user.

The destination recommendation system according to each of the foregoing embodiments may be used as a navigation device or an in-vehicle device.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A destination recommendation system comprising:
    a travel history database that stores travel history data of a vehicle;
    a trip destination determination section that determines, based on the travel history data, a plurality of trip destinations corresponding to a hub position when the number or a frequency of a plurality of visits from the hub position to each of the trip destinations satisfies a predetermined condition, the hub position being a point having the number of departures equal to or larger than a predetermined number of departures, the predetermined number of departures being equal to or greater than two, the predetermined condition relates to at least the number or the frequency of the visits;
    a calculation section that calculates a distance or necessary travel time from the hub position to each of the trip destinations, and calculates a mode value of the distance or a mode value of the necessary travel time;
    a map database that stores a plurality of facility data related to a plurality of facilities including a target facility, the target facility being a facility to be recommended to a user in response to a destination recommendation request from the user;
    a search section that, in response to the destination recommendation request from the user, searches the plurality of facility data stored in the map database for the target facility that is located within a range of the mode value of the distance or the mode value of the necessary travel time from a departure point of the user; and
    an output portion that outputs the target facility searched by the search section to the user,
    wherein the trip destination determination section determines, as the trip destinations, a point other than (i) points that are regularly visited by the user for a business purpose, and (ii) points that are regularly visited by the user for a routine purpose,
    wherein the predetermined condition is satisfied when the number of the visits from the hub position to each of the trip destinations during a predetermined time period is equal to or smaller than a predetermined number of visits.

2. The destination recommendation system according to claim 1, further comprising
    a hub position determination section that determines the hub position based on the travel history data,
    wherein the travel history data stored in the travel history database includes data related to plural visit points that have been visited by the user,
    wherein each of the plural visit points has a plurality of departures with respect to plural arrival points, and
    wherein, among the plural visit points, the hub position determination section determines one visit point having a maximum number of departures among the plural visit points as the hub position.

3. The destination recommendation system according to claim 1, further comprising
    an input portion that receives a target property of the target facility to be searched,
    wherein the calculation section divides the trip destinations into a plurality of groups based on a property of each of the trip destinations, and calculates the mode value of the distance or the mode value of the necessary travel time for each of the groups, and
    wherein the search section determines one of the groups as a target group when the property of each of the trip destinations included in the one of the groups is equal to the target property received by the input portion, and searches for the target facility that is located within the range of the mode value of the distance or the mode value of the necessary travel time of the target group.

4. The destination recommendation system according to claim 1, further comprising
    an input portion that receives a target travel time from the hub position to the target facility,
    wherein the calculation section divides the trip destinations into a plurality of groups based on the necessary travel time, and calculates the mode value of the distance or the mode value of the necessary travel time for each of the groups, and
    wherein the search section determines one of the groups as a target group when the necessary travel time of each of the trip destinations included in the one of the groups is equal to the target travel time received by the input portion, and searches for the target facility that is located within the range of the mode value of the distance or the mode value of the necessary travel time of the target group.

5. The destination recommendation system according to claim 1,
    wherein the points that are regularly visited by the user for the business purpose and the routine purpose include a company and a hospital.

6. A method of recommending a trip destination to a user, the method being executed by a destination recommendation system based on travel history data of a vehicle that is stored in a travel history database, the method comprising:
    setting a position having the number of departures equal to or larger than a predetermined number of departures as a hub position based on the travel history data, the predetermined number of departures being equal to or greater than two;
    determining a plurality of trip destinations when the number or a frequency of a plurality of visits from the hub position to each of the trip destinations satisfies a predetermined condition;
    calculating a distance or necessary travel time from the hub position to each of the trip destinations;
    calculating a mode value of the distance or a mode value of the necessary travel time;
    searching a plurality of facility data stored in a map database for a target facility that is located within a range of the mode value of the distance or the mode value of the necessary travel time, the map database storing the plurality of facility data related to the plurality of facilities including the target facility, the target facility being a facility to be recommended to the user in response to a destination recommendation request from the user; and outputting the target facility to the user, wherein the trip destinations which are determined are a point other than (i) points that are regularly visited by the user for a business purpose, and (ii) points that are regularly visited by the user for a routine purpose, wherein the predetermined condition is satisfied when the number of the visits from the hub position to each of the trip destinations during a predetermined time period is equal to or smaller than a predetermined number of visits.

7. A program product stored in a non-transitory computer-readable medium for recommending a trip destination to a user based on travel history data stored in a travel history database, the program product being executed by a computer and comprising instructions for:

setting a position having the number of departures equal to or larger than a predetermined number of departures as a hub position based on the travel history data, the predetermined number of departures being equal to or greater than two;

determining a plurality of trip destinations when the number or a frequency of a plurality of visits from the hub position to each of the trip destinations satisfies a predetermined condition;

calculating a distance or necessary travel time from the hub position to each of the trip destinations;

calculating a mode value of the distance or a mode value of the necessary travel time;

searching a plurality of facility data stored in a map database for a target facility that is located within a range of the mode value of the distance or the mode value of the necessary travel time, the map database storing the plurality of facility data related to the plurality of facilities including the target facility, the target facility being a facility to be recommended to the user in response to a destination recommendation request from the user; and outputting the target facility to the user, wherein the trip destinations which are determined are a point other than (i) points that are regularly visited by the user for a business purpose, and (ii) points that are regularly visited by the user for a routine purpose, wherein the predetermined condition is satisfied when the number of the visits from the hub position to each of the trip destinations during a predetermined time period is equal to or smaller than a predetermined number of visits.

8. The destination recommendation system according to claim 1, wherein the search section searches the plurality of facilities, which are stored in the map database and include a facility that is not visited by the user, for the target facility that is located within the range of the mode value of the distance or the mode value of the necessary travel time.

9. The destination recommendation system according to claim 1, wherein the trip destination determination section determines a visit point that is visited by the user for a recreational purpose but not for a business purpose or a routine purpose as the trip destination.

10. The method according to claim 6, wherein the searching step searches the plurality of facilities, which are stored in the map database and include a facility that is not visited by the user, for the target facility that is located within the range of the mode value of the distance or the mode value of the necessary travel time.

11. The method according to claim 6, wherein the determining step determines a visit point that is visited by the user for a recreational purpose but not for a business purpose or a routine purpose as the trip destination.

12. The program product according to claim 7, wherein the instructions for searching search the plurality of facilities, which are stored in the map database and include a facility that is not visited by the user, for the target facility that is located within the range of the mode value of the distance or the mode value of the necessary travel time.

13. The program product according to claim 7, wherein the instructions determining determine a visit point that is visited by the user for a recreational purpose but not for a business purpose or a routine purpose as the trip destination.

14. The destination recommendation system according to claim 1, wherein the trip destination determination section determines that the point is regularly visited by the user for a business purpose or a routine purpose and which the trip destination determination section excludes as the trip destinations, when a plurality of visits from the hub position to the point, which is determined to not be a stop-off point to another point, exceeds the predetermined number of visits and the plurality of visits to the point are performed during a predetermined time period.

* * * * *